United States Patent
Lim

(10) Patent No.: US 8,189,944 B1
(45) Date of Patent: May 29, 2012

(54) FAST EDGE-PRESERVING SMOOTHING OF IMAGES

(75) Inventor: Suk Hwan Lim, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 909 days.

(21) Appl. No.: 12/243,726

(22) Filed: Oct. 1, 2008

Related U.S. Application Data

(60) Provisional application No. 61/038,700, filed on Mar. 21, 2008.

(51) Int. Cl.
*G06K 9/40* (2006.01)
(52) U.S. Cl. .................................. 382/260; 382/262
(58) Field of Classification Search .................. 382/205, 382/262, 268, 272, 273, 300, 308, 260
See application file for complete search history.

(56) References Cited

U.S. PATENT DOCUMENTS

| | | | | |
|---|---|---|---|---|
| 6,011,540 | A * | 1/2000 | Berlin et al. ................ | 345/601 |
| 7,146,059 | B1 | 12/2006 | Durand et al. | |
| 7,269,295 | B2 | 9/2007 | Keshet et al. | |
| 7,599,569 | B2 * | 10/2009 | Smirnov et al. ............. | 382/260 |
| 2007/0009175 | A1 | 1/2007 | Lim et al. | |
| 2007/0160285 | A1 * | 7/2007 | Gondek et al. .............. | 382/162 |
| 2007/0165962 | A1 | 7/2007 | Smirnov et al. | |
| 2008/0158396 | A1 * | 7/2008 | Fainstain et al. ............ | 348/246 |
| 2008/0170800 | A1 * | 7/2008 | Bergman et al. ............ | 382/275 |
| 2009/0154825 | A1 * | 6/2009 | Yang et al. .................. | 382/260 |

OTHER PUBLICATIONS

Guarnieri et al., Fast bilateral filter for edge-preserving smoothing, Mar. 30, 2006, Electronic Letters, vol. 42, No. 7, 2 pages total.*

Ben Weiss. Fast median and bilateral filtering. ACM Transactions on Graphics, 25(3):519-526, 2006. Proceedings of the SIGGRAPH conference.
Sylvain Paris et al., "A Fast Approximation of the Bilateral Filter using a Signal Processing Approach," MIT technical report 2006 (MIT-CSAIL-TR-2006-073).
Bergman, Ruth et al., "Comprehensive Solutions for Removal of Dust and Scratches from Images," HP Tech Report, HPL-2007-20 (Mar. 21, 2007).
Ivan Viola et al., "Hardware-Based Nonlinear Filtering and Segmentation using High-Level Shading Languages," Visualization, 2003. VIS 2003. IEEE, Volume , Issue , Oct. 24-24, 2003 pp. 309-316.
A. Bhat et al., "Perceptually Optimised Variable Bilateral Filter for Low Bit-rate Video Coding," The 8th Annual PostGraduate SymposiumonThe Convergence of Telecommunications, Networking and Broadcasting, Jun. 28-29, 2007.
C.Tomasi et al., "BilateralFilteringforGrayandColorImages," Proceedingsofthe1998IEEEInternational Conferenceon Computer Vision, Bombay, India.
Durand, F., Dorsey, J.: Fast bilateral filtering for the display of high-dynamic-range images. ACM Trans. on Graphics 21 (2002) Proc. of SIGGRAPH conference.

* cited by examiner

*Primary Examiner* — Matthew Bella
*Assistant Examiner* — Dennis Rosario

(57) ABSTRACT

In accordance with a method of filtering an image of image forming elements, a respective weighted average value is determined for each of selected ones of the image forming elements. The respective weighted average value is composed of equally weighted contributions of values that are associated with neighboring ones of the image forming elements in a neighborhood of the selected image forming element and are within a threshold photometric distance of the selected image forming element. The respective weighted average value is free of contributions from any of the image forming elements outside the neighborhood and is free of contributions from any of the image forming elements beyond the threshold photometric distance of the selected image forming element. An output image is produced from the determined weighted average values.

18 Claims, 4 Drawing Sheets

| -12 | -11 | -10 | -9 | -8 |
| --- | --- | --- | --- | --- |
| -7 | -6 | -5 | -4 | -3 |
| -2 | -1 | 0 | 1 | 2 |
| 3 | 4 | 5 | 6 | 7 |
| 8 | 9 | 10 | 11 | 12 |

US 8,189,944 B1

FAST EDGE-PRESERVING SMOOTHING OF IMAGES

CROSS REFERENCE TO RELATED APPLICATIONS

This Application claims the benefit of U.S. Provisional Application Ser. No. 61/038,700, filed Mar. 21, 2008, titled "Fast Edge-preserving Smoothing Of Images"

BACKGROUND

The bilateral filter is a non-linear filter that was introduced by Tomasi and Manduchi (C. Tomasi and R. Manduchi, "Bilateral filtering for gray and color images," in Proceedings of the IEEE International Conference on Computer Vision, Bombay, India, 1998) for selective denoising of images without blurring edges. The key idea of the bilateral filter is to modify the weights of a convolution mask in an image-dependent manner, based on intensity differences between the pixel under consideration and its neighbors. The conventional bilateral filtering approach, however, requires many floating multiplication operations and a division operation. This approach can be too complex to implement in devices with limited processing and memory resources.

SUMMARY

The invention features a method of filtering an image, which includes image forming elements. In accordance with this inventive method, a respective weighted average value is determined for each of selected ones of the image forming elements. The respective weighted average value is composed of equally weighted contributions of values that are associated with neighboring ones of the image forming elements in a neighborhood of the selected image forming element and are within a threshold photometric distance of the selected image forming element. The respective weighted average value is free of contributions from any of the image forming elements outside the neighborhood and is free of contributions from any of the image forming elements beyond the threshold photometric distance of the selected image forming element. An output image is produced from the determined weighted average values.

The invention also features apparatus and a computer-readable medium storing computer-readable instructions causing a computer to implement the method described above.

Other features and advantages of the invention will become apparent from the following description, including the drawings and the claims.

DETAILED DESCRIPTION

Figure 1:
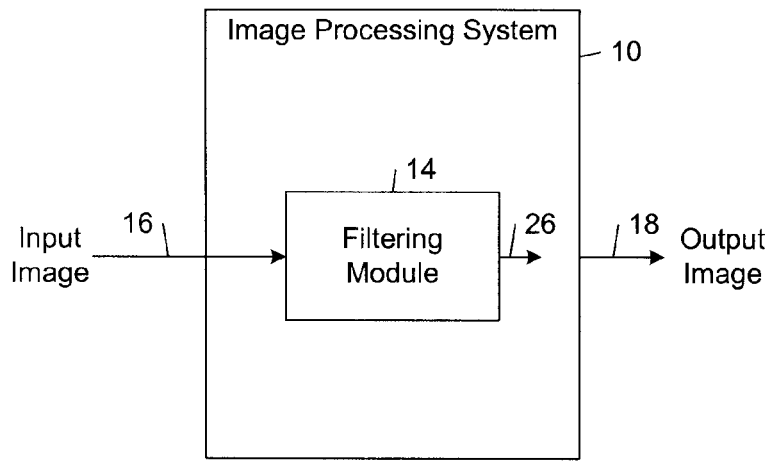
FIG. 1 is a block diagram of an embodiment of an image processing system that includes a filtering module.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. OVERVIEW

The embodiments that are described in detail below are capable of performing edge-preserving smoothing of images without requiring significant memory and computational resources. Due to their efficient use of processing and memory resources, some of these embodiments may be implemented with relatively small and inexpensive components that have modest processing power and modest memory capacity. As a result, these embodiments are highly suitable for incorporation in compact device environments that have significant size, processing, and memory constraints, including but not limited to portable telecommunication devices (e.g., a mobile telephone and a cordless telephone), a microprojector, a personal digital assistant (PDA), a multimedia player, a game controller, a pager, image and video recording and playback devices (e.g., digital still and video cameras, VCRs, and DVRs), printers, portable computers, and other embedded data processing environments (e.g., application specific integrated circuits (ASICs)).

II. DEFINITION OF TERMS

The term "image forming element" refers to an addressable region of an image. In some embodiments, the image forming elements correspond to pixels, which are the smallest addressable units of an image. Each image forming element has at least one respective value that is represented by one or more bits. For example, an image forming element in the RGB color space includes a respective value for each of the colors red, green, and blue, where each of the values may be represented by one or more bits.

A "selected" image forming element is an image forming element in an input image with respect to which a neighborhood of image forming elements is defined for the purpose of determining a weighted average value of a corresponding image forming element in a filtered version of the input image.

The term "spatially corresponding image forming elements" refers to image forming elements of different images that correspond to substantially the same spatial regions of the images. In some implementations, spatially corresponding image forming elements are image forming elements from the same image forming element locations (e.g., coordinates) within the image frames (e.g., the image forming element locations in one image spatially correspond to the same image forming elements locations in another image). In some implementations, spatially corresponding image forming elements are image forming elements that have been determined (e.g., by motion compensation techniques) to correspond to the same location in a scene that is captured in both of the different images.

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine. Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

The term "processor" refers to an electronic circuit, usually on a single chip, which performs operations including but not limited to data processing operations, control operations, or both data processing operations and control operations.

III. INTRODUCTION

FIG. 1 shows an embodiment of an image processing system 10 that includes a filtering module 14. In operation, the image processing system 10 processes an input image signal 16 to produce an output image 18.

The filtering module 14 typically is part of an image processing pipeline of the image processing system 10. The image processing pipeline typically includes one or more image data processing components in addition to the filtering module 14. For example, the image processing pipeline may include one or more image data processing components that are located upstream of the filtering module 14 and one or more image data processing components that are located downstream of the filtering module 14.

In some embodiments, the input image 16 is in the form of a raw or minimally processed readout signal that is produced by an image sensor (e.g., a CCD image sensor or a CMOS image sensor). In other embodiments, the input image 16 corresponds to image forming element data obtained from an image file stored on a machine-readable medium. In these embodiments, the input image 16 may correspond to any type of digital image, including an original image (e.g., a video frame, a still image, or a scanned image) that was captured by an image sensor (e.g., a digital video camera, a digital still image camera, or an optical scanner) or a processed (e.g., sub-sampled, filtered, reformatted, scene-balanced or otherwise enhanced or modified) version of such an original image.

Figure 2:
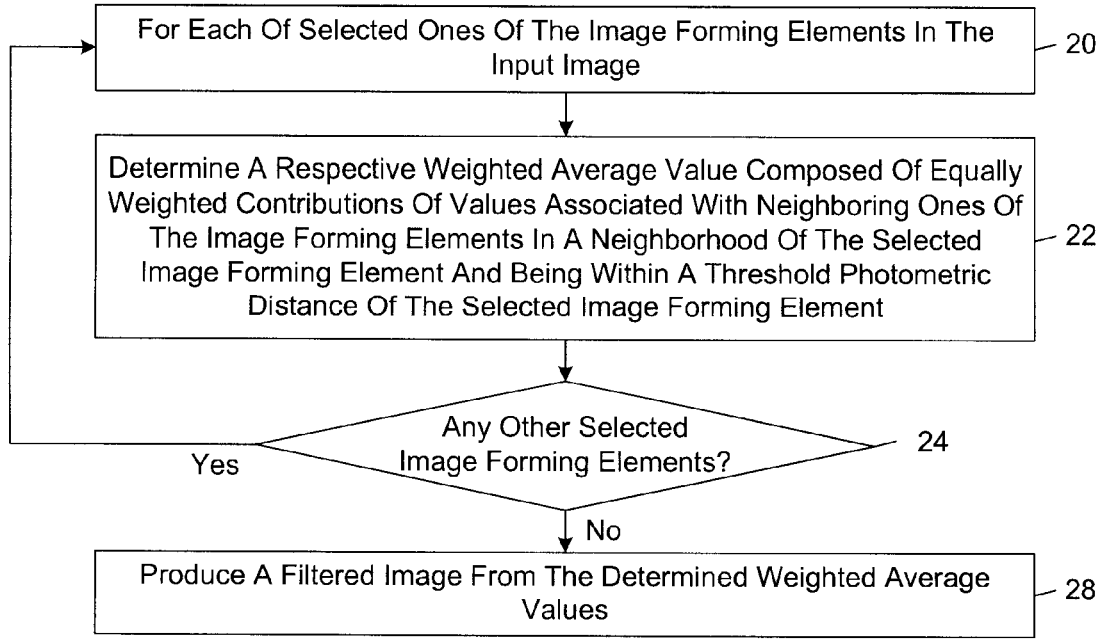
FIG. 2 is a flow diagram of an embodiment of an image processing method.

FIG. 2 shows an embodiment of a method that is implemented by the image processing system 10.

In accordance with the method of FIG. 2, the filtering module 14 determines a respective weighted average value 26 for each of selected ones of the image forming elements of the input image 16 (FIG. 2, blocks 20, 22, 24). Each respective weighted average value is composed of equally weighted contributions of values that are associated with neighboring ones of the image forming elements in a neighborhood of the selected image forming element and are within a threshold photometric distance of the selected image forming element. Each respective weighted average value is free of contributions from any of the image forming elements that are outside the neighborhood and is free of contributions from any of the image forming elements that are beyond the threshold photometric distance of the selected image forming element. In some embodiments, a respective weighted average value is determined for each of the image forming elements of the input image 16. The filtering module 14 outputs the weighted average values 26.

The image processing system 10 produces the output image 18 from the determined weighted average values 26 (FIG. 2, block 28). In some embodiments, the image processing system 10 outputs the weighted average values 26 as the values of the image forming elements of the output image 18. In other embodiments, the image processing system 10 processes the filtered image data 26 produced by the filtering module 14 before outputting the output image 18. For example, in some embodiments, the image processing system 10 compresses the filtered image data 26 in accordance with a compression process (e.g., the JPEG compression process for still images, and the H264 or MPEG compression process for video images) before outputting the output image 18.

In some embodiments, the image processing system 10 stores at least a portion of the output image 18 on a machine-readable data storage medium. In some embodiments, the image processing system 10 stores the entire output image 18 in the machine readable data storage medium at one time. In other embodiments, the image processing system 10 stores the filtered image 18 in the machine readable data storage medium on a line-by-line basis in order to meet the constraints imposed by embedded environments, such as embedded printer environments in which one or both of the processing resources and the memory resources are severely constrained. In some embodiments, the image processing system 10 outputs the output image 18 by rendering the output image 18. For example, in some embodiments, the image processing system 10 renders the output image 18 on a display. The display may be, for example, a flat panel display, such as a LCD (liquid crystal display), a plasma is display, an EL display (electro-luminescent display) and a FED (field emission display). In other embodiments, the thumbnail image processing system 10 renders the output image 18 on a print medium (e.g., a sheet of paper).

IV. EXEMPLARY EMBODIMENTS OF THE IMAGE PROCESSING SYSTEM AND ITS COMPONENTS

A. Overview

The image processing system 10 typically is implemented by one or more discrete data processing components (or modules) that are not limited to any particular hardware, firmware, or software configuration. For example, in some implementations, the image processing system 10 is embedded in the hardware of any one of a wide variety of electronic apparatus, including desktop and workstation computers, image and video recording and playback devices (e.g., VCRs and DVRs), cable or satellite set-top boxes capable of decoding and playing paid video programming, portable radio and satellite broadcast receivers, and portable telecommunications devices. The filtering module 14 is a data processing component that may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the data processing components of the image processing system 10 are combined into a single data processing component. In some embodiments, the respective functionalities of each of one or more of the data processing components of the image processing system 10 are performed by a respective set of multiple data processing components.

In some implementations, process instructions (e.g., machine-readable code, such as computer software) for implementing the methods that are executed by the image processing system 10, as well as the data it generates, are stored in one or more machine-readable media.

B. An Exemplary Embodiment of the Filtering Module

As explained above, the filtering module 14 determines a respective weighted average value 26 for each of selected ones of the image forming elements of the input image 16 (see FIG. 2, blocks 20, 22, 24). In some embodiments, the filtering module 14 computes a respective weighted average value $v_0$, for the selected image forming element 0 in accordance with equation (1):

$$v_0 = \frac{\sum_{n \in N_0} g_n(P_n) \cdot P_n}{\sum_{n \in N_0} g_n(P_n)} \quad (1)$$

where $g_n(\cdot)$ is an edge-preserving weighting function and $P_n$ is a photometric distance value for image forming element n within the neighborhood $N_0$ of the selected image forming element 0.

Figures 3, 4:
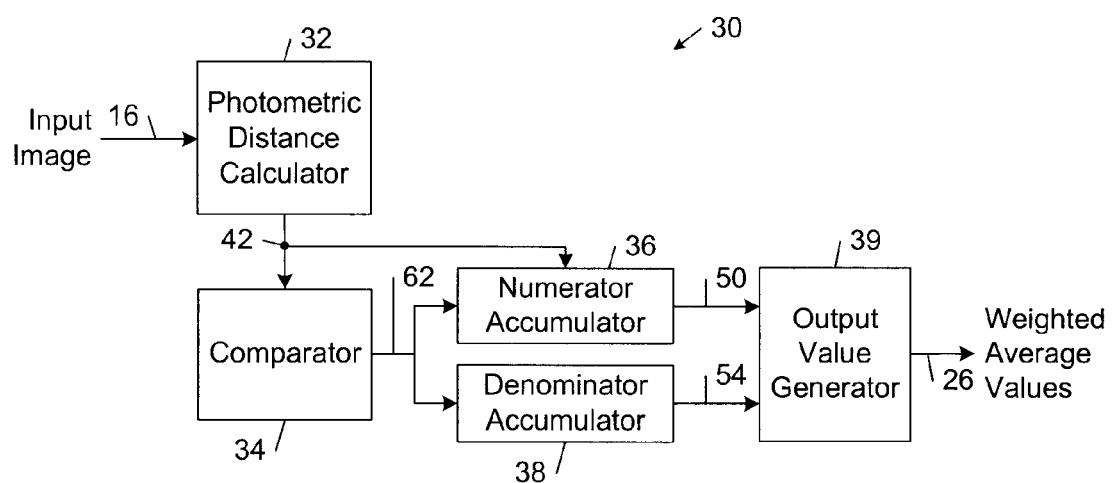
FIG. 3 is a block diagram of an embodiment of an exemplary neighborhood of indexed image forming elements.
FIG. 4 is a block diagram of an embodiment of the filtering module shown in FIG. 1.

The neighborhood $N_0$ typically is centered symmetrically about the selected image forming element. The neighborhood $N_0$ typically is defined with respect to a K×K block of image forming elements, where K typically has an odd integer value greater than one. The size of the neighborhood $N_0$ may be constant across the input image 16 or it may vary dynamically across the input image 16. For example, in some embodiments, the size of the neighborhood varies based on local noise statistics in regions of the input image 16. The neighborhood $N_0$ may or may not include the selected image forming element. FIG. 3 shows an exemplary neighborhood that consists of a block of 5×5 image forming elements, where the numbers in the blocks represent the index values n of the image forming elements.

In some embodiments, the input image 16 is part of an image sequence (e.g., a sequence of successive video frames or a sequence of still images successively captured within a short time range, such as on the order of one second, or less. In some of these embodiments, the neighborhood $N_0$ is expanded to include image forming elements in respective two-dimensional neighborhoods of spatially corresponding image forming elements in one or more images that are adjacent to the input image 16 in the sequence. For example, in some of these embodiments, the neighborhood $N_0$ includes image forming elements in a three-dimensional space (two spatial dimensions, e.g., x and y, and time) surrounding the selected image forming element 0 in the input image 16. In one exemplary implementation, the neighborhood $N_0$ consists of eight image forming elements surrounding the selected image forming element 0 and nine image forming elements from each of the two images adjacent to the input image 16 in the sequence to form a 3×3×3−1 box of image forming elements. Other than the dimensionality of the neighborhood $N_0$, the filtering method described above in connection with FIG. 2 is the same.

Figure 5:
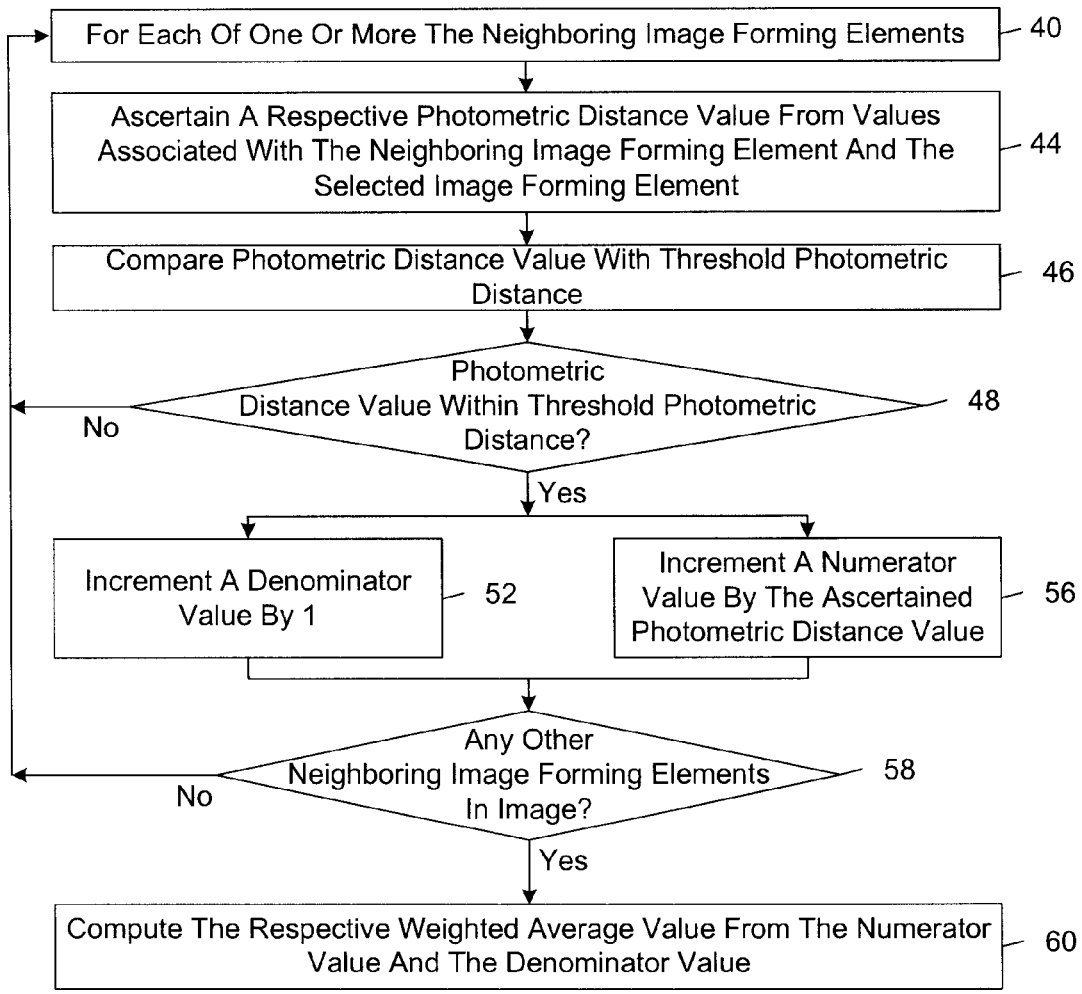
FIG. 5 is a flow diagram of an embodiment of a method implemented by the filtering module shown in FIG. 3.

FIG. 4 shows an embodiment 30 of the filtering module 14 that includes a photometric distance calculator 32, a comparator 34, a numerator accumulator 36, a denominator accumulator 38, and an output value generator 39. FIG. 5 shows an embodiment of a method that implemented by the weights calculation module 30.

In accordance with the method of FIG. 5, for each of one or more of the neighboring image forming elements (FIG. 5, block 40), the photometric distance calculator 32 ascertains a respective photometric distance value 42 from values associated with the neighboring image forming element and the selected image forming element (FIG. 5, block 44). The photometric distance calculator 32 passes the calculated photometric distance values 42 to the comparator 34 and the numerator accumulator 36. The comparator 34 compares the photometric distance value with a threshold photometric distance (FIG. 5, block 46). The process is repeated if the photometric distance value is outside the threshold photometric distance (FIG. 5, block 48). If the photometric distance value is within the threshold photometric distance (FIG. 5, block 48), the denominator accumulator 38 increments a denominator value 50 by one (FIG. 5, block 52) and the numerator accumulator increments a numerator value 54 by the ascertained photometric distance value (FIG. 5, block 56). After all the neighboring image forming elements have been processed (FIG. 5, block 58), the output value generator 39 computes the respective weighted average value 26 from the numerator value 50 and the denominator value 54 (FIG. 5, to block 60).

The photometric distance values 42 measure the photometric distances of the neighboring image forming elements from the selected image forming element, which typically is the centrally located image forming element in the neighborhood. In particular, the photometric distances measure the differences in contrast between the neighboring image forming elements and the selected image forming element. In some embodiments, the photometric distance is calculated in accordance with the zeroth order difference equation (2):

$$P_n = a \cdot (I_n - I_0) \quad (2)$$

where a is a scalar constant, $I_n$ is a value associated with image forming element n, and $I_0$ is a value associated with image forming element value 0. The parameters $I_n$ and $I_0$ typically are the intensity values of the image forming elements n and 0. In other embodiments, the photometric distance is calculated in accordance with the first order difference equation (3):

$$P_n = \beta \cdot \left( \frac{1}{2} \cdot (I_{-n} + I_n) - I_0 \right) \quad (3)$$

where β is a scalar constant, $I_n$ is a value associated with image forming element n, $I_{-n}$ is a value associated with image forming element −n, and $I_0$ is a value associated with image forming element value 0.

The comparator 34 compares the photometric distance values with a threshold photometric distance ($T_0$), which may be constant across the input image 16 or may vary dynamically across the input image. In some embodiments, the threshold photometric distance ($T_0$) is a function of noise in the input image 16. For example, in some exemplary embodiments, the threshold photometric distance ($T_0$) is twice the noise standard deviation, which may be a local value or a global value depending on the particular implementation of the filtering module 30. The comparator 34 passes the results 62 of the comparison to the numerator accumulator 36 and the denominator accumulator 38.

In response to receipt of each comparison value 62 indicating that the current photometric distance value is within the threshold photometric distance, the numerator accumulator 36 increments the numerator value 50 by one and the denominator accumulator 38 increments the denominator value 54 by the current photometric distance value. In the illustrated embodiment, the current numerator and denominator values 50, 54 respectively correspond to the current values of the numerator and denominator of equation (1), where the values of the weighting function g(•) is given by equation (4):

$$g_n(P_n) = \begin{cases} 1 & \text{for } \lceil P_n \rceil < T_0 \\ 0 & \text{otherwise} \end{cases} \quad (4)$$

In equation (4), $P_n$ is a photometric distance value for the image forming element n within the neighborhood $N_0$ of the selected image forming element 0, and $T_0$ is the threshold photometric distance.

The output value generator 39 computes the respective weighted average value 26 from the numerator value 50 and the denominator value 54. In general, the output value generator 39 may compute the weighted average value 26 in a variety of different ways. For example, in some embodiments that are not processing or memory resource constrained, the output value generator 39 computes the weighted average value 26 by dividing the numerator value 50 by the denominator value 54. In other embodiments, the output value generator 39 computes the weighted average value 26 by replacing the division operation with a multiplication operation followed by an integer number of register shifts.

The following pseudo code describes an embodiment of the method of FIG. 4 in which the photometric distance is calculated in accordance with the first order difference equation (2) and the selected (i.e., center) image forming element is omitted from the neighborhood N.

Initialize the Denominator variable to 0 and the Numerator value to 0
For each image forming element to be filtered
    For each image forming element in the neighborhood except for the center to image forming element (which has a value In), {
        Compute the intensity difference between the neighboring image forming element and the center image forming element
        Compare the computed difference with $T_0$ and $-T_0$
        If the computed difference is between $T_0$ and $-T_0$, {
            Denominator=Denominator+1;
            Numerator=Numerator+computed difference;
        } Else {
        }
    }
    If Denominator is not zero
        Out=In+(NumeratorLUT1(Denominator))>>LUT2 (Denominator)
    Else
        Out=In Embodiments in accordance with the pseudo code described above utilize two lookup tables LUT1 and LUT2. In some embodiments, the LUT1 contains a respective value given by $2^c$/Denominator for each of the possible values of the Denominator variable, where the parameter c has an empirically determined constant value that corresponds to the binary bit precision of the effective division operation implemented by the right shifting operation in the first equation for the variable Out in the pseudo code described above. In particular, the product of the Numerator and the value in the LUT1 indexed by the Denominator value is right-shifted by c bits. For a K×K neighborhood that excludes the center image forming element, the LUT1 contains $K^2-1$ values for embodiments in which the zeroth order photometric distance equation (2) is used, whereas the LUT1 contains $\frac{1}{2}(K^2-1)$ values for embodiments in which the first order photometric distance equation (3) is used. In these embodiments, the LUT2 is equal to the precision parameter c and only contains one value.

In other embodiments, the binary bit precision parameter c varies in a Denominator-dependent way. In these embodiments, the LUT1 contains respective to values given by $2^{LUT2(Denominator)}$/Denominator for each of the possible values of the Denominator variable and the LUT2 contains the variable binary bit precision values.

As explained above, in embodiments, the neighborhood $N_0$ is expanded to include image forming elements of images adjacent to the input image 16 in an image sequence. In these embodiments, the LUT1 contains values for each of the image forming elements in the neighborhood $N_0$. For example, in the implementation in which the neighborhood $N_0$ consists of a 3×3×3−1 box of image forming elements, the LUT1 includes twenty-six values. Other than the dimensionality of the neighborhood, the filtering method described above in connection with the pseudo code is the same.

V. EXEMPLARY ARCHITECTURES OF THE IMAGE PROCESSING SYSTEM AND ASSOCIATED APPLICATION ENVIRONMENTS

Figure 6:
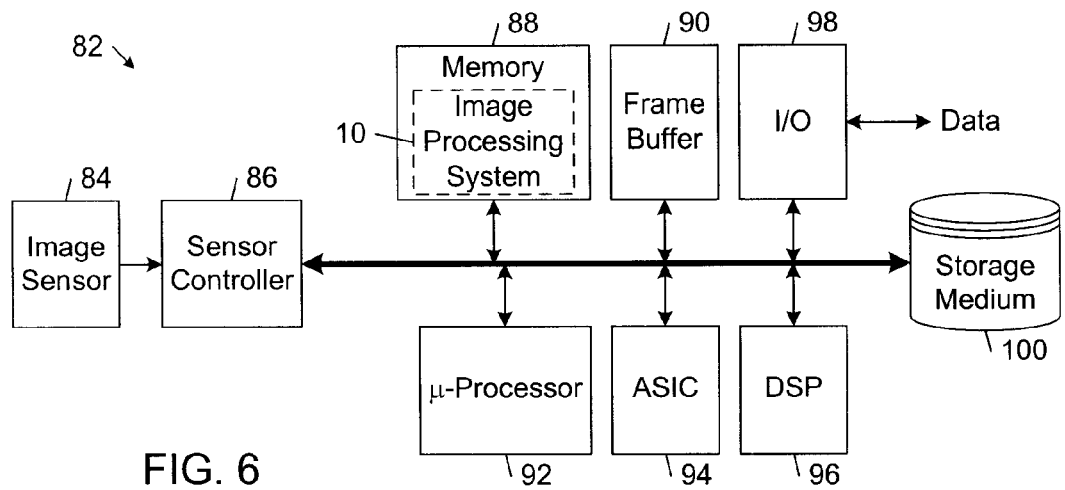
FIG. 6 is a block diagram of an embodiment of a digital camera system that incorporates an embodiment of the image processing system shown in FIG. 1.

A. A First Exemplary Image Processing System Architecture and Application Environment FIG. 6 shows an embodiment of a digital camera system 82 that incorporates an embodiment of the image processing system 10. The digital camera system 82 may be configured to capture one or both of still images and video image frames. The digital camera system 82 includes an image sensor 84 (e.g., a charge coupled device (CCD) or a complementary metal-oxide-semiconductor (CMOS) image sensor), a sensor controller 86, a memory 88, a frame buffer 90, a microprocessor 92, an ASIC (application-specific integrated circuit) 94, a DSP (digital signal processor) 96, an I/O (input/output) adapter 98, and a storage medium 100. The values that are output from the image sensor 84 may be, for example, 8-bit numbers or 12-bit numbers, which have values in a range from 0 (no light) to 255 or 4095 (maximum brightness). In general, the image processing system 10 may be implemented by one or more of hardware and firmware components. In the illustrated embodiment, the image processing system 10 is implemented in firmware, which is loaded into memory 88. The storage medium 100 may be implemented by any type of image storage technology, including a compact flash memory card and a digital video tape cassette. The image data stored in the storage medium 100 may be transferred to a storage device (e.g., a hard disk drive, a floppy disk drive, a CD-ROM drive, or a non-volatile data storage device) of an external processing system (e.g., a computer or workstation) via the I/O subsystem 98.

The microprocessor 92 controls the operation of the digital camera system 82, including processing the input image captured by the image sensor 84 in accordance with the image processing methods that are described herein. The microprocessor 92 typically is programmed to perform various operations on the resulting denoised image 20, including one or more of the following operations: demosaicing; color correction; image compression; one or more storage operations; and one or more transmission operations.

In some of these embodiments, the input image 16 and the filtered image data 26 are in the color filter array domain where the image forming element data are arranged in accordance with the spatial arrangement of color filters in the color filter array. For example, in some implementations, the image sensor 84 captures raw Bayer pattern images each of which includes an array of pixels corresponding to colors in a repeating spatial 2×2 pattern in which the upper left pixel is a red pixel, the upper right pixel is a green pixel, the lower left pixel is a green pixel, and the lower right pixel is a blue pixel. In these embodiments, the filtered image data 26 so typically is fed into one or more downstream image processing blocks, including a demosaicing block, that process the filtered image data 16 into a compressed or uncompressed denoised image. The demosaicing block separates different color images from the filtered image data 26.

Figure 7:
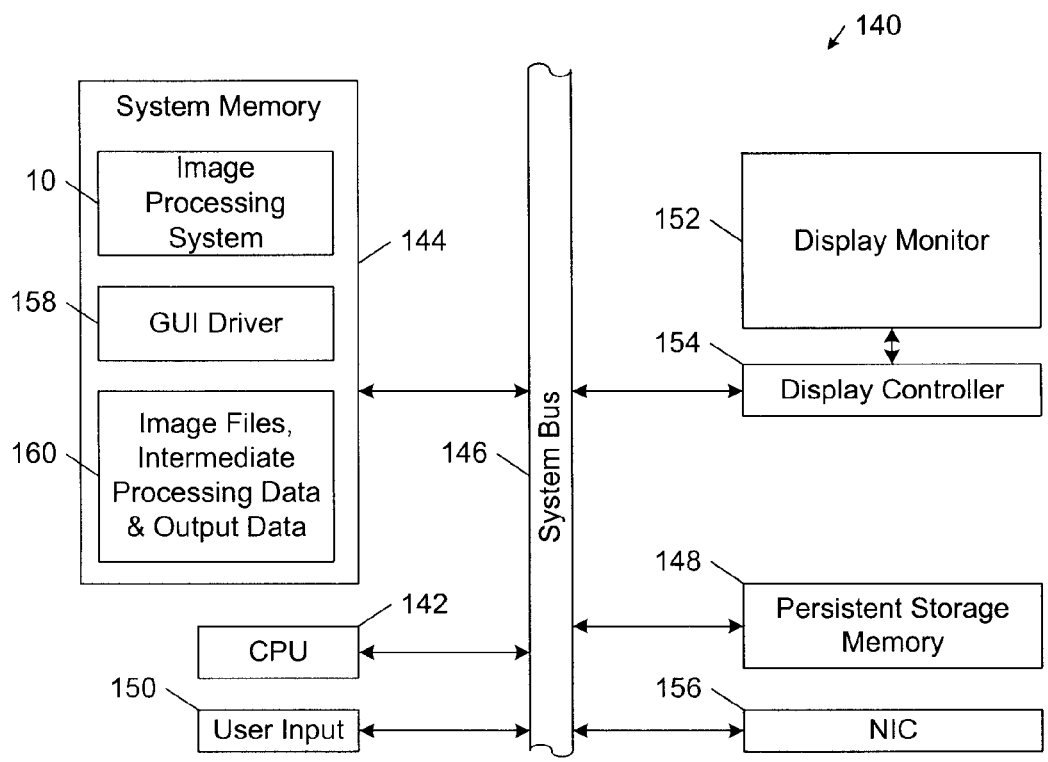
FIG. 7 is a block diagram of an embodiment of a computer system that is programmable to implement an embodiment of the image processing system shown in FIG. 1.

B. A Second Exemplary Image Processing System Architecture and Application Environment FIG. 7 shows an embodiment of a computer system 140 that incorporates an embodiment of the image processing system 110. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer system 140 using one or more input devices 150 (e.g., a keyboard, a computer mouse, a microphone, joystick, and touch pad). Information may be presented through a graphical user interface (GUI) that is displayed to the user on a display monitor 152, which is controlled by a display controller 154. The computer system 140 also typically includes peripheral output devices, such as speakers and a printer. One or more remote computers may be connected to the computer system 140 through a network interface card (NIC) 156.

As shown in FIG. 7, the system memory 144 also stores an embodiment of the image processing system 10, a GUI driver 158, and a database 160 containing image files corresponding to the input image 16 and the denoised image 20, intermediate processing data, and output data. In some embodiments, the image processing system 10 interfaces with the GUI driver 158 and the user input 150 to control the creation of the output image 18. In some embodiments, the computer system 140 additionally includes a graphics application program that is configured to render image data on the display monitor 152 and to perform various image processing operations on one or both of the input image 16 and the output image 18.

V. CONCLUSION

Among other things, the embodiments that are described herein are capable of performing edge-preserving smoothing of images without requiring significant memory and computational resources. Due to their efficient use of processing and memory resources, some of these embodiments may be implemented with relatively small and inexpensive components that have modest processing power and modest memory capacity.

Other embodiments are within the scope of the claims.

What is claimed is:

1. A computer-implemented method of filtering an image comprising image forming elements, the method comprising:
   for each of selected ones of the image forming elements,
      determining a respective weighted average value composed of equally weighted contributions of values associated with neighboring ones of the image forming elements in a neighborhood of the selected image forming element and being within a threshold photometric distance of the selected image forming element, wherein the weighted average value is free of contributions from any of the image forming elements outside the neighborhood and is free of contributions from any of the image forming elements beyond the threshold photometric distance of the selected image forming element; and
   producing an output image from the determined weighted average values;
   wherein for each of the selected ones of the image forming elements the determining comprises:
      for each of the neighboring image forming elements
         ascertaining a respective photometric distance value from values associated with the neighboring image forming element and the selected image forming element,
         in response to a determination that the ascertained photometric distance value is within the threshold photometric distance, incrementing a denominator value by one and incrementing a numerator value by the ascertained photometric distance value; and
      computing the respective weighted average value from the incremented numerator value and the incremented denominator value.

2. The method of claim 1, wherein for each of the image forming elements the determining comprises determining the respective weighted average value $v_0$ in accordance with $$v_0 = \frac{\sum_{n \in N_0} g_n(P_n) \cdot P_n}{\sum_{n \in N_0} g_n(P_n)}$$

where $$g_n(P_n) = \begin{cases} 1 & \text{for } \lceil P_n \rceil < T_0 \\ 0 & \text{otherwise} \end{cases}$$

where $P_n$ is a photometric distance value for the image forming element n within the neighborhood $N_0$ of the selected image forming element 0, and $T_0$ is the threshold photometric distance.

3. The method of claim 2, wherein $P_n = a \cdot (I_n - I_0)$, where a is a scalar constant, $I_n$ is a value associated with image forming element n, and $I_0$ is a value associated with image forming element value 0.

4. The method of claim 2, wherein $$P_n = \beta \cdot \left( \frac{1}{2} \cdot (I_{-n} + I_n) - I_0 \right),$$

where β is a scalar constant, $I_n$ is a value associated with image forming element n, $I_{-n}$ is a value associated with image forming element −n, and $I_0$ is a value associated with image forming element value 0.

5. The method of claim 1, wherein the computing comprises multiplying the numerator value by a first value indexed by the denominator value in a lookup table to produce a product, and right-shifting the product by an amount given by a second value.

6. The method of claim 5, wherein the lookup table comprises values given by $$\frac{2^c}{D}$$

where c is a parameter relating to a constant binary bit precision and D is the incremented denominator value, and the right-shifting comprises right-shifting the product by c bits.

7. The method of claim 5, wherein the lookup table comprises values given by $$\frac{2^{LUT2(D)}}{D}$$

where D is the incremented denominator value and LUT2(D) is a value indexed by D in a second lookup table comprising values relating to a variable bit precision, and the right-shifting comprises right-shifting the product by LUT(D) bits.

8. The method of claim 1, wherein for each of the selected image forming elements the determined weighted average value excludes contributions from the selected image forming element.

9. The method of claim 1, wherein for each of the selected image forming elements the determined weighted average value includes contributions from image forming elements in at least one additional image.

10. Apparatus, comprising:
a memory; and
a processing unit coupled to the memory and the display and operable to perform operations comprising
for each of selected ones of the image forming elements,
determining a respective weighted average value composed of equally weighted contributions of values associated with neighboring ones of the image forming elements in a neighborhood of the selected image forming element and being within a threshold photometric distance of the selected image forming element, wherein the weighted average value is free of contributions from any of the image forming elements outside the neighborhood and is free of contributions from any of the image forming elements beyond the threshold photometric distance of the selected image forming element; and
producing an output image from the determined weighted average values;
wherein for each of the selected ones of the image forming elements the determining comprises:
for each of the neighboring image forming elements
ascertaining a respective photometric distance value from values associated with the neighboring image forming element and the selected image forming element,
in response to a determination that the ascertained photometric distance value is within the threshold photometric distance, incrementing a denominator value by one and incrementing a numerator value by the ascertained photometric distance value; and
computing the respective weighted average value from the incremented numerator value and the incremented denominator value.

11. The apparatus of claim 10, wherein in the determining the processor is operable to perform for each of the image forming elements operations comprising determining the respective weighted average value $v_0$ in accordance with $$v_0 = \frac{\sum_{n \in N_0} g_n(P_n) \cdot P_n}{\sum_{n \in N_0} g_n(P_n)}$$

where $$g_n(P_n) = \begin{array}{ll} 1 & \text{for } \lceil P_n \rceil < T_0 \\ 0 & \text{otherwise} \end{array}$$

where $P_n$ is a photometric distance value for the image forming element n within the neighborhood $N_0$ of the selected image forming element 0, and $T_0$ is the threshold photometric distance.

12. A non-transitory computer-readable medium storing machine-readable instructions for filtering an image comprising image forming elements, the computer-readable instructions causing a computer to perform operations comprising:
for each of selected ones of the image forming elements,
determining a respective weighted average value composed of equally weighted contributions of values associated with neighboring ones of the image forming elements in a neighborhood of the selected image forming element and being within a threshold photometric distance of the selected image forming element, wherein the weighted average value is free of contributions from any of the image forming elements outside the neighborhood and is free of contributions from any of the image forming elements beyond the threshold photometric distance of the selected image forming element; and
producing an output image from the determined weighted average values;
wherein in the determining the computer-readable instructions cause the computer to perform for each of the selected ones of the image forming elements operations comprising:
for each of the neighboring image forming elements
ascertaining a respective photometric distance value from values associated with the neighboring image forming element and the selected image forming element, in response to a determination that the ascertained photometric distance value is within the threshold photometric distance, incrementing a denominator value by one and incrementing a numerator value by the ascertained photometric distance value; and computing the respective weighted average value from the incremented numerator value and the incremented denominator value.

13. The computer-readable medium of claim 12, wherein in the determining the computer-readable instructions cause the computer to perform for each of the image forming elements operations comprising determining the respective weighted average value $v_0$ in accordance with $$v_0 = \frac{\sum_{n \in N_0} g_n(P_n) \cdot P_n}{\sum_{n \in N_0} g_n(P_n)}$$

where $$g_n(P_n) = \begin{cases} 1 & \text{for } \lceil P_n \rceil < T_0 \\ 0 & \text{otherwise} \end{cases}$$

where $P_n$ is a photometric distance value for the image forming element n within the neighborhood $N_0$ of the selected image forming element 0, and $T_0$ is the threshold photometric distance.

14. The computer-readable medium of claim 13, wherein $P_n = a \cdot (I_n - I_0)$, where a is a scalar constant, $I_n$ is a value associated with image forming element n, and $I_0$ is a value associated with image forming element value 0.

15. The computer-readable medium of claim 13, wherein $$P_n = \beta \cdot \left( \frac{1}{2} \cdot (I_{-n} + I_n) - I_0 \right),$$

where $\beta$ is a scalar constant, $I_n$ is a value associated with image forming element n, $I_{-n}$ is a value associated with image forming element −n, and $I_0$ is a value associated with image forming element value 0.

16. The computer-readable medium of claim 13, wherein in the computing the computer-readable instructions cause the computer to perform operations comprising multiplying the numerator value by a first value indexed by the denominator value in a lookup table to produce a product, and right-shifting the product by an amount given by a second value.

17. The computer-readable medium of claim 16, wherein the lookup table comprises values given by $$\frac{2^c}{D}$$

where c is a parameter relating to a constant binary bit precision and D is the incremented denominator value, and the right-shifting comprises right-shifting the product by c bits.

18. The computer-readable medium of claim 16, wherein the lookup table comprises values given by $$\frac{2^{LUT2(D)}}{D}$$

where D is the incremented denominator value and LUT2(D) is a value indexed by D in a second lookup table comprising values relating to a variable bit precision, and the right-shifting comprises right-shifting the product by LUT(D) bits.

* * * * *

UNITED STATES PATENT AND TRADEMARK OFFICE
CERTIFICATE OF CORRECTION

| | |
|---|---|
| PATENT NO. | : 8,189,944 B1 |
| APPLICATION NO. | : 12/243726 |
| DATED | : May 29, 2012 |
| INVENTOR(S) | : Suk Hwan Lim |

Page 1 of 1

It is certified that error appears in the above-identified patent and that said Letters Patent is hereby corrected as shown below:

In column 10, line 64, in Claim 3, delete "$P_n=a \cdot (I_n-I_0)$," and insert -- $P_n=\alpha \cdot (I_n-I_0)$, --, therefor.

In column 10, line 64, in Claim 3, delete "a" and insert -- $\alpha$ --, therefor.

In column 13, line 36, in Claim 14, delete "$P_n=a \cdot (I_n-I_0)$," and insert -- $P_n=\alpha \cdot (I_n-I_0)$, --, therefor.

In column 13, line 36, in Claim 14, delete "a" and insert -- $\alpha$ --, therefor.

In column 14, line 11, in Claim 16, delete "claim 13," and insert -- claim 12, --, therefor.

Signed and Sealed this
Eighteenth Day of December, 2012

David J. Kappos
*Director of the United States Patent and Trademark Office*